June 23, 1959     D. P. LANGLOIS     2,891,869
PROCESS FOR PREPARING STARCH SYRUPS
Filed June 3, 1953     4 Sheets-Sheet 3
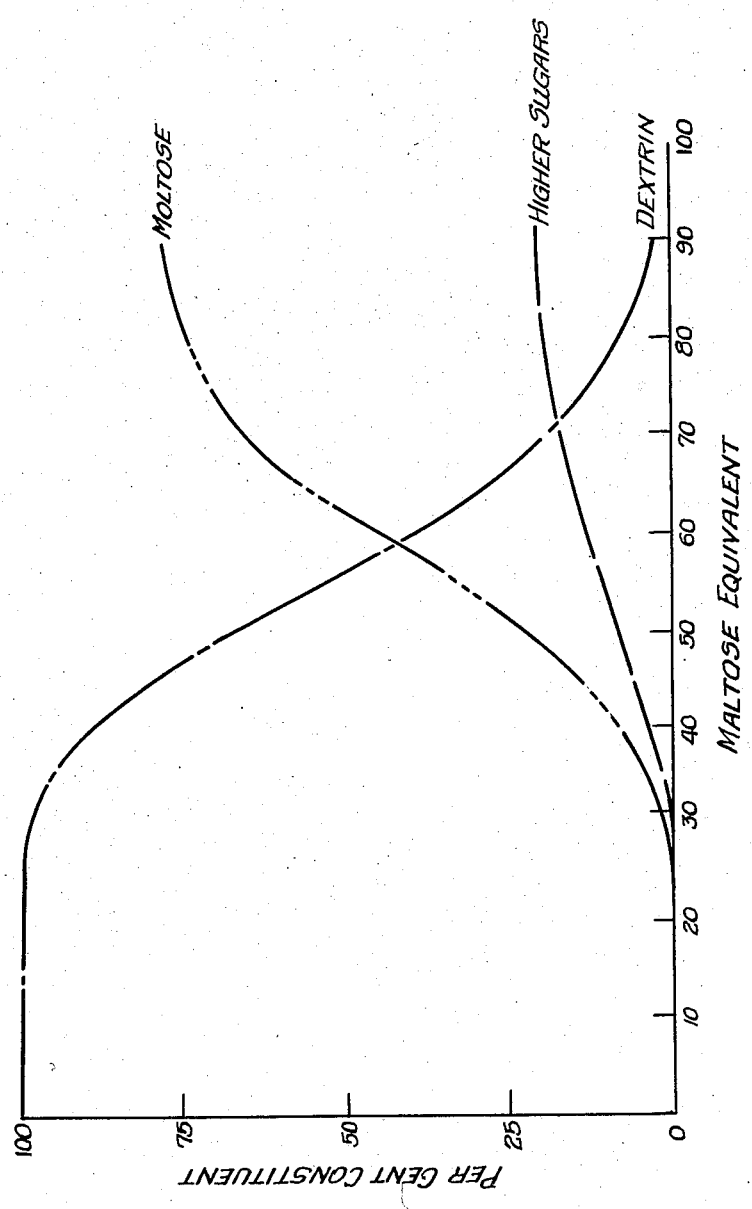
INVENTOR.
David P. Langlois,
BY

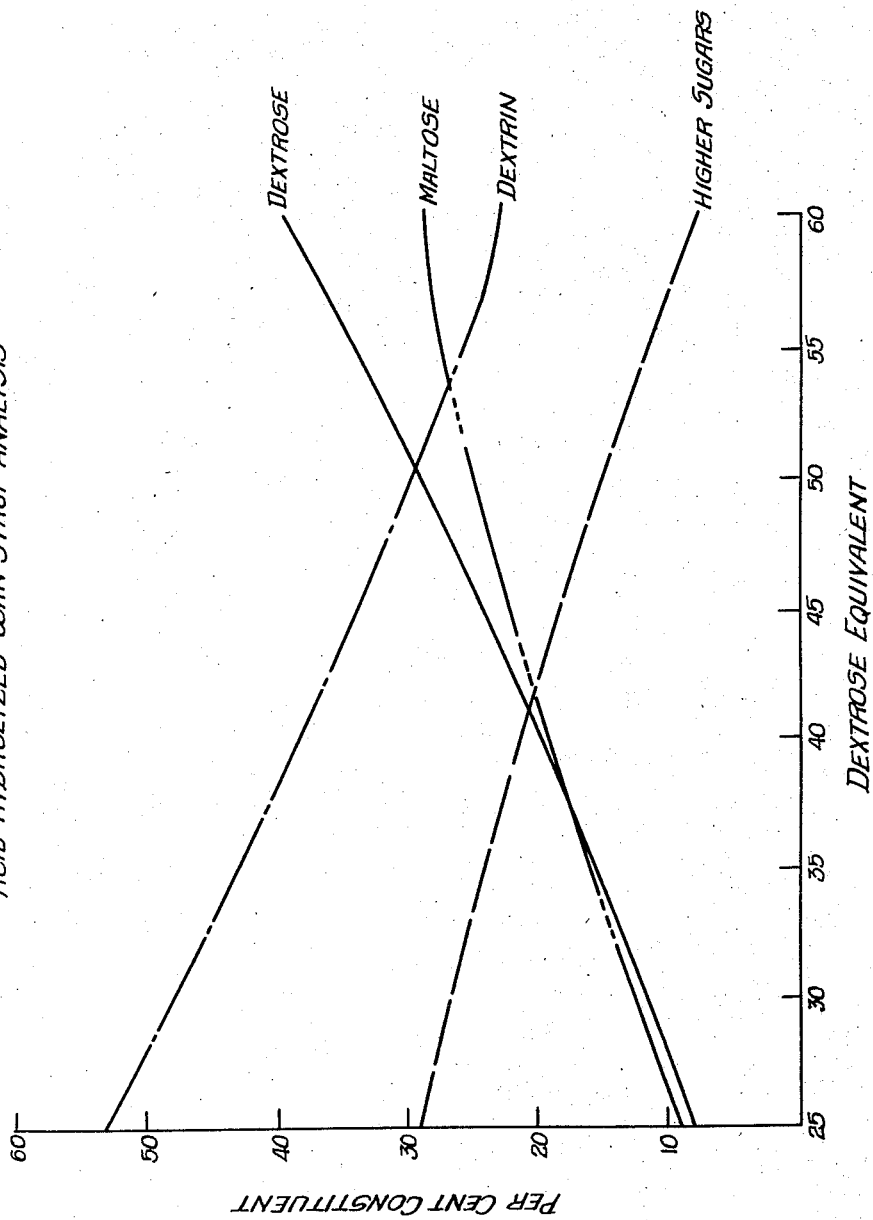

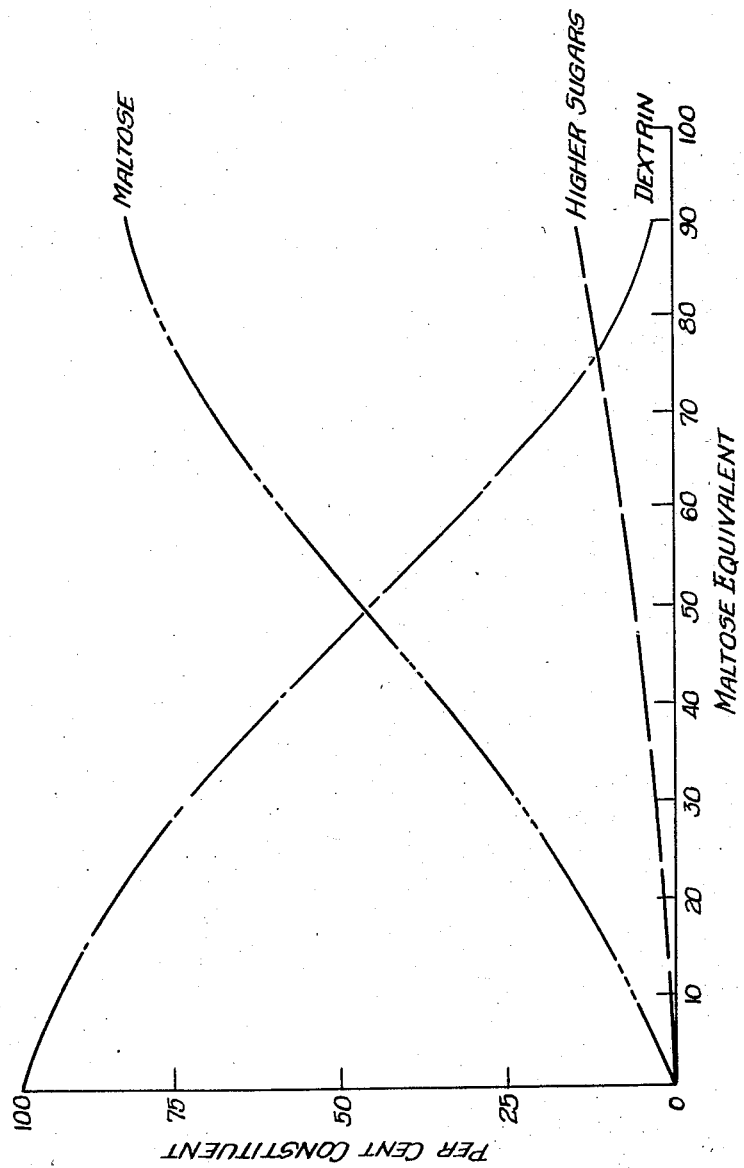

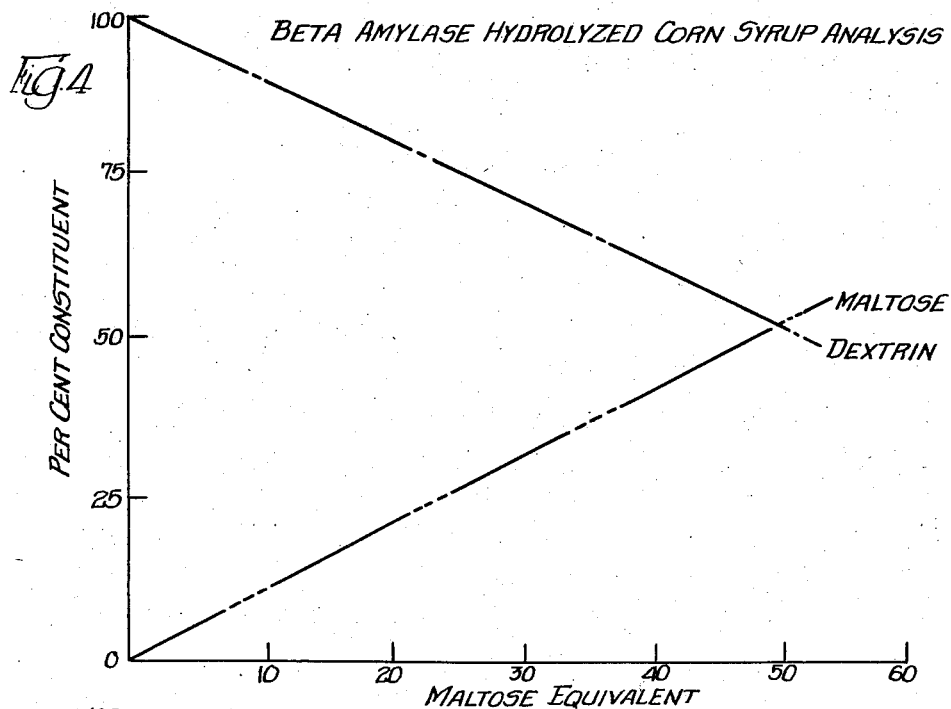
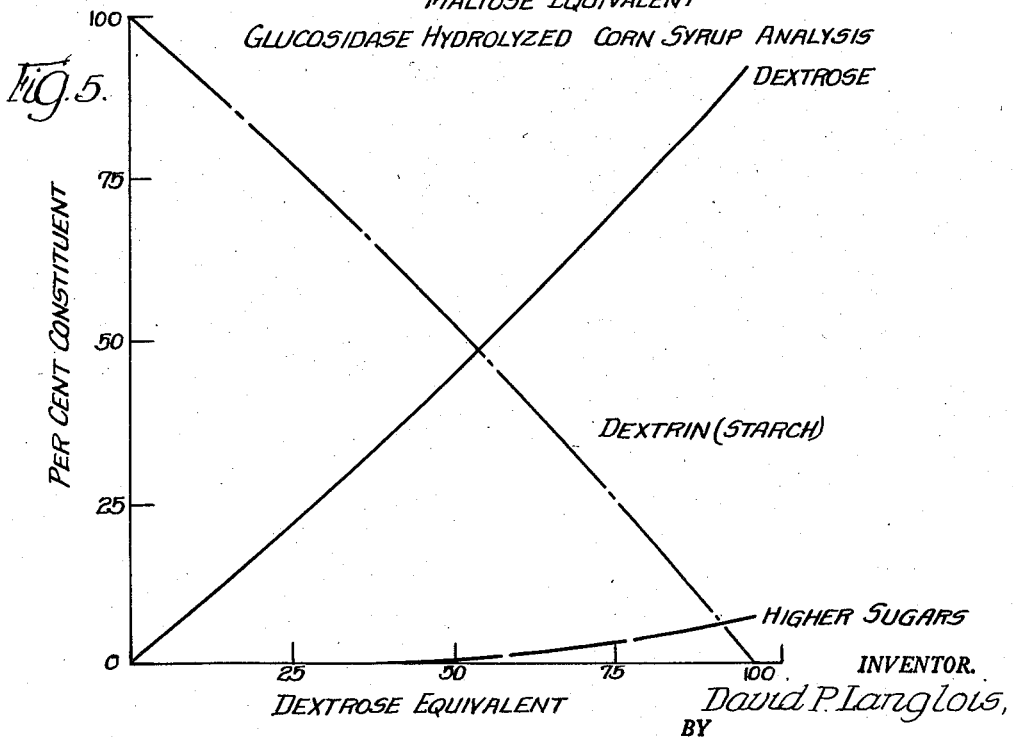

United States Patent Office 2,891,869
Patented June 23, 1959

2,891,869

PROCESS FOR PREPARING STARCH SYRUPS

David P. Langlois, Decatur, Ill., assignor to A. E. Staley Manufacturing Company, Decatur, Ill., a corporation of Delaware Application June 3, 1953, Serial No. 359,290

4 Claims. (Cl. 99—142)

This invention relates, generally, to certain innovations and improvements in converting starch with enzymes, and it has particular relation to the innovation and improvement which comprises treating starch with two or more enzymes having distinctly different starch conversion characteristics so as to obtain syrups having desired predetermined combinations of specific chemical and physical properties within a wide range.

It has been long known to convert starch with dilute acid so as to make syrup, and the annual production of starch syrup in this country by the starch-syrup industry amounts to a considerable tonnage. In addition to the straight acid conversion of starch to syrup, considerable quantities of an extra sweet syrup are manufactured by an improved process wherein the starch is partially converted with acid and then enzyme converted into the finished product. This combination acid and enzyme conversion process is disclosed in Dale and Langlois Patent No. 2,201,609, granted May 21, 1940. At the present time the starch syrup industry utilizes either a straight acid conversion process or a combination acid and enzyme conversion process such as disclosed in Patent 2,201,609. Because of its greater commercial importance and availability, corn starch is used to the greatest extent for conversion into syrup and starch syrups are for the most part corn syrups.

Starch syrups which are manufactured by a straight acid conversion process will correspond closely in properties when converted to the same degree. For example, corn syrup produced by straight acid conversion, having a dextrose equivalent (generally abbreviated as D.E.) of 42%, will be found to contain about 22% dextrose, 20% maltose, 20% higher sugars and 38% dextrins. All 42 D.E. corn syrups prepared by acid hydrolysis have essentially this same composition. Likewise, starch syrup manufactured by the combination acid and enzyme conversion process will correspond fairly closely in properties, although this type of process affords a wider range in the properties obtained, depending upon the ratio of the conversion obtained by the acid step to that obtained by the enzyme converting step.

For simplicity and practical characterization purposes, starch conversion or starch hydrolysis products, such as syrups, are divided into the four components mentioned above, namely: dextrose, a monosaccharide; maltose, a disaccharide; higher sugars, which include the trisaccharides and tetrasaccharides; and dextrins, which include all polymers higher than tetrasaccharides. Dextrose represents the ultimate degree of conversion or hydrolysis of starch, whereas dextrins represent the smallest degree of conversion or hydrolysis. Maltose and the higher sugars represent intermediate degrees of conversion or hydrolysis.

Both the chemical and physical properties of any particular starch syrup will depend primarily upon its particular content of these four main components. Since dextrose is sweeter than maltose, and maltose is sweeter than the higher sugars and dextrins, which are nearly tasteless, it follows that the higher dextrose-maltose content a syrup has, the sweeter it will be. The maximum sweetness is attained in a syrup having maximum dextrose content. On the other hand, dextrins are composed of relatively large molecules and therefore dextrins contribute viscosity or body to a syrup, whereas dextrose and maltose molecules do not. A syrup which has a high dextrin content will have greater viscosity and will have more body to it than one which has a low dextrin content. In addition to sweetening power and viscosity or "body," which have been mentioned, other important properties of syrups include reducing power, humectant character, fermentability, osmotic pressure, and freezing point, depending upon the use which is to be made of a syrup.

The straight acid conversion process and the combination acid and enzyme conversion process of Dale and Langlois permitted only the manufacture of starch syrups which adhered rather closely to relatively narrow patterns with respect to their physical and chemical properties. By means of the present invention it is now possible to make starch conversion products, particularly starch syrups, which have almost any desired pattern or combination of physical and chemical properties within a wide range, and therefore the starch syrup industry need no longer be restricted to the manufacture of a few syrup products which are pretty much standardized.

A brief discussion of the chemistry of the starch molecule and the different converting actions which acid and the different enzymes have thereon, as shown by the curves presented in the accompanying drawings, will facilitate an understanding of the present invention. The figures of the drawings will be identified as they are referred to. It is now know that starch is composed of dextrose units linked together by hemiacetal linkages and that about 95% of these linkages are from the 1 position of one dextrose unit to the 4 position of the adjacent dextrose unit. The balance of the linkages are between the 1 and 6 positions so as to form branches in the starch molecules. These hemiacetal linkages are sensitive to acid and are readily hydrolized in acid solutions. Since 95% of the linkages are equivalent, the acid has no specificity for this large majority of the linkages and the acid hydrolysis therefore is a random one. The ensuing products of acid conversion are dextrose and dextrose polymers of various degrees of polymerization, ranging from maltose to dextrins, and for any given degree of hydrolysis of starch with acid, as measured by the copper reducing value, for example, there is only one composition that will occur. In other words, for any given degree of hydrolysis of corn starch with acid the content or ratios of dextrose, maltose, higher sugars and dextrins will be essentially the same. Therefore, the acid conversion products of starch follow a definite and set pattern with respect to the contents of these four components. Because of this fact, in carrying out acid conversions it is the practice, for purposes of control, to follow only the so-called D.E. value of the syrup since for any particular D.E. value of an acid converted syrup there will be a known and corresponding set of other values. Obviously, such a narrow pattern severely limits the syrup manufacturer and does not permit him to produce syrups for various special uses where specific properties are desired which cannot be obtained in a syrup made by the straight acid conversion process.

Fig. 1 of the drawings contains a set of four curves showing the percentage content of dextrose, maltose, higher sugars and dextrin for straight acid converted corn syrup between D.E. values of 25 to 60.

The combination acid and enzyme conversion process disclosed in Dale and Langlois Patent No. 2,201,609 made it possible to obtain a syrup having a higher D.E.

value and, therefore, greater sweetening power than had previously been obtainable, without incurring the formation of the undesirable bitter tasting by-product which is referred to as "hydrol." However, the combined acid and enzyme conversion process did not enlarge greatly upon the narrow range of properties to which the starch syrup manufacturer was limited in straight acid conversions.

It has been found, according to the present invention, that by employing two or more enzymes having different starch-converting characteristics, starch syrups having practically any desired combination of syrup properties can be readily obtained. In general the enzymes can be used either simultaneously or successively. While three or more enzymes may be used, it will usually be necessary to employ only two in order to obtain a syrup having the desired set or combination of chemical and physical properties.

Among the enzymes that may be mentioned as illustrative of those having notably different starch-converting activities or patterns are: alpha amylase; beta amylase; malt diastase; and amylo-glucosidase.

Malt diastase is characterized by its property of inducing hydrolysis of the hemiacetal linkages of starch. This enzyme differs from acid in that it has a certain specificity for particular linkages, and hence these are hydrolyzed preferentially. Maltose and dextrin appear as the main products of hydrolysis with a small amount of higher sugars occurring in the latter stages of reaction when this enzyme is used. Dextrose is only a minor product of the reaction unless it is allowed to go for an extremely long time. Also, the dextrins are of a different character from those obtained by acid hydrolysis, since a conditioned hydrolysis instead of a random hydrolysis occurs. While entirely different syrups are obtained from malt hydrolysis than are obtained from acid hydrolysis, still, for any degree of hydrolysis by malt diastase as measured, for example, by maltose equivalent, there is only one syrup composition possible. Fig. 2 of the drawings contains a set of three curves showing the results obtained when corn starch is hydrolyzed with malt diastase enzyme.

Alpha amylase has a starch hydrolysis pattern which bears considerable similarity to that for malt diastase, as shown by Fig. 3 of the drawings containing a set of three curves showing the results obtained when corn starch is converted or hydrolyzed with alpha amylase. However, there is one notable difference in the hydrolysis patterns since in the early stages of alpha amylase hydrolysis, only reducing dextrins and no maltose or higher sugars are formed until a maltose equivalent of about 25 is reached. With a malt diastase hydrolysis maltose appears as an initial product of reaction.

The hydrolysis pattern for beta amylase hydrolysis as shown by the set of curves shown in Fig. 4 is strikingly different from those of alpha amylase and malt diastase. Beta amylase acts only on the non-reducing end of the starch chains and splits off maltose units stepwise down the chain. Hence, only maltose and the unreacted portions of the starch molecules are present at any time. The reaction does not go to completion so as to convert all of the starch to maltose but stops when only about 50% of maltose is formed. This phenomenon is explainable as follows in the light of recent discoveries concerning the nature of the starch molecules.

Starch has been found to be a heterogeneous substance made up of two components, amylose and amylopectin. The ratios of these two components vary from one kind of starch to another. Amylose is a straight chain molecule made up of dextrose units linked to each other through the 1 and 4 positions as in amylose but periodically a branching occurs by a linkage forming between the 1 and 6 positions of two dextrose molecules. This creates the nucleus for a side chain which is made up, as in the case of the main chain, of more dextrose units linked through the 1 and 6 positions. Only about four percent of the total linkages of the amylopectin molecule are of the 1,6- variety but as can be seen from the illustration they are so arranged that only about half of the dextrose units extend out beyond the branched points. Beta amylase being able to split only 1,4- linkages stepwise down a chain and not being able to by-pass other linkages hydrolyzes only about 50% of the amylopectin molecule, leaving the rest as a limit dextrin. Alpha amylase, on the other hand, splits the 1,4- linkages at random and not stepwise down the chain. This accounts for the strong starch liquefying action of alpha amylase. It will not, however, split the 1,6- linkages. The action of alpha amylase, therefore, is to break starch down into smaller and smaller units until ultimately only maltose and small polysaccharides containing the 1,6- linkages result.

The fourth enzyme mentioned above, i.e., amyloglucosidase, is characterized by its ability to hydrolyze starch directly to dextrose, as shown by the set of curves contained in Fig. 5. This enzyme attacks the starch molecules at the non-reducing end of the chain and splits off dextrose units stepwise down the chain, hydrolyzing all 1,4- linkages. It has the property of being able to jump over all 1,6- linkages so that 95% hydrolysis of starch to dextrose is easily obtained. The 1,6- linkages are slowly hydrolyzed by the amyloglucosidase or by concomitant enzymes, so that eventually starch can be hydrolyzed 100% by this enzyme. The enzyme attack of amyloglucosidase being stepwise down the chain, one molecule of starch is completely hydrolyzed before the next molecule is attacked. Hence, in the hydrolysis medium only dextrose and starch are present, with just a trace of transient dextrins or higher sugars. In fact, the content of higher sugars can be limited rather easily to no more than 5%.

There are other types of starch converting enzymes that are known and may be used, and it can be reasonably expected that still other enzymes will become available from time to time. Therefore, enzymes which are presently known and available, as well as those which may become available hereafter, can be utilized in accordance with the present invention to carry out the starch conversion processes disclosed therein.

Desirable and optimum reaction conditions for the various enzymes are known or can be readily established. Because of its greater commercial availability and importance, corn starch will ordinarily be used. However, other starches may be used such as tapioca, waxy maize, wheat, arrow root, potato and other starches.

In the light of the foregoing, the object of the invention, generally stated, is controllably to convert starch, particularly corn starch, into starch conversion products, particularly starch syrups, having practically any desired predetermined combination of chemical and physical properties within a wide range, by employing two or more enzymes, each of which gives its own particular starch conversion pattern.

An important object of the invention is the controlled conversion of corn starch into corn syrups by the use of two or more enzymes having their own distinctive starch conversion characteristics so as to make possible the production of what are, in effect, "custom-made" or "tailor-made" syrups suitable for a wide variety of special uses.

The above and certain other objects of the invention will, in part, be obvious and will, in part, appear hereinafter.

For a more complete understanding of the nature and scope of the invention reference may now be had to the following additional description thereof, which includes a number of illustrative examples representing various embodiments of the invention.

In general it is preferable to first acid convert starch because higher starch concentrations can be used. Therefore, the starch will usually first be acid converted to a starch substrate of desired D.E. value, depending upon the particular syrup product desired, preliminary to treatment with the enzymes. Of course, whenever it is necessary, or when there is some advantage, the raw starch can be treated directly with the enzymes.

GENERAL PROCEDURE

In general, the starch substrates will be acid converted products of varying D.E. values between about 20 and 55. The acid converted substrates are prepared essentially as follows: a slurry of corn starch is hydrolyzed at about 20° Bé. and 2.2 pH under 30 to 40 pounds steam pressure until the desired conversion is obtained. The acid converted substrate is then further converted with enzymes. The enzyme converted substrate is neutralized to the desired pH usually between 5 and 5.5. It may be filtered, or not, and concentrated, or not, depending on cenvenience. The enzymes are added to the subtrate and the conversion made at the desired temperature for the appropriate length of time (e.g. 55° C. for about 48 hours). The length of time used can be controlled by the amount of enzyme used.

Example 1

To make a corn syrup having a D.E. of 64.2, a D. (percent dextrose) of 34, and a F.E. (fermentable extract) of 71.6, a corn starch substrate converted by acid to 49 D.E. according to the general procedure described above, was converted with 0.025% colase and 0.025% hydralase (fungal enzyme from *Aspergillus oryzae*) for 48 hours at 55° C. and 5.5 pH. The resulting syrup had the desired D.E., D. and F.E. values. Colase is purified malt enzyme.

Example 2

To make a syrup having a D.E. of 66.9, a D. of 42.2 and a F.E. of 69.5 the same 49 D.E. starch substrate as used in Example 1 was treated with 0.025% colase and one unit of amyloglucosidase per gram D.S. (one unit amyloglucosidase converts 0.1 g. of starch to completion in 48 hours at 4 pH and 55° C.) for 48 hours at 5 pH and 55° C.

Example 3

It was desired to make a product having a D.E. of 67, a D. of 42 and a F.E. of 69.5. The same 49 D.E. starch substrate as used in Example 1 was further converted by 0.05% colase at 55° and 5.5 pH for 48 hours. The product had a D.E. of 59.4, a D. of 27.5, and an F.E. of 69.2. The pH was adjusted to 4.5 and 1 unit of amyloglucosidase was added. The temperature was maintained at 55° for another 48 hours.

This is an example of a two stage process, for the preparation of substantially the product as described in Example 2.

Example 4

In order to make a syrup product having a 61.5 D.E., a 28.7 D. and a 72.0 F.E. a starch substrate converted by acid to 42 D.E. was further treated with 0.025% colase and 0.025% hydralase at 5.5 pH and 55° C. for 48 hours. The desired product was obtained.

Example 5

The syrup of Example 4 was also made by a two-stage enzyme conversion process. The same 42 D.E. starch substrate as used in Example 1 was further converted by 0.025% colase for 48 hours at 55° and 5.5 pH. At this point 0.025% of hydralase was added and the conversion continued for 48 hours at the same conditions.

Example 6

In order to make a syrup having a 64.4 D.E. a 35.9 D. and a 70.3 F.E., the same 42 D.E. starch as used in Example 4 was further treated with 0.025% colase and one unit/g. of amyloglucosidase at 5 pH and 55° C. for 48 hours.

Example 7

To make a syrup having a 52.4 D.E., a 21.8 D. and a 69.0 F.E., a starch substrate converted by acid to 26 D.E. was treated with 0.05% colase and 0.025% hydralase for 48 hours at 55° C. and 5.5 pH.

Example 8

In order to make a syrup having a 68.9 D.E., 43.3 D. and 71.4 F.E., the same 26 D.E. starch substrate as was used in Example 7 was further treated with 0.05% colase and 2.5 units/g. of amyloglucosidase at 5.0 pH and 55° C. for 48 hours.

It will be noted that in all of the above examples syrups of essentially the same fermentable extract were produced, but the dextrose content varied over a very wide range. Since the sweetness varies with the dextrose content the sweetness of the nine syrups will be appreciably different. The higher sugars and dextrins of the nine syrups are almost constant so the difference between them is entirely due to the difference in dextrose and maltose ratio. By varying the conditions even more than is given in these examples, the dextrose to maltose ratio is capable of even greater variation. By a similar set of conditions, the dextrose could be held constant and the maltose and dextrins varied to give syrups of constant sweetness but varying "bodying" power.

In view of the foregoing disclosure, those skilled in the art will be able to practice the invention either by following the examples given or such other embodiments of the invention as will be apparent. Accordingly, all matter disclosed above is intended to be interpreted as illustrative and not in a limiting sense.

What is claimed as new is:

1. The method of producing corn syrup having predetermined chemical and physical properties and substantial predetermined contents of at least two of the starch conversion fractions comprising dextrins, higher sugars, maltose and dextrose, which comprises, converting a corn starch acid hydrolyzate with at least two different enzymes having distinctive starch converting characteristics and terminating said conversion when a syrup is obtained having said predetermined composition and properties.

2. The method of producing corn syrup having predetermined chemical and physical properties and substantial predetermined contents of at least two of the starch conversion fractions comprising dextrins, higher sugars, maltose and dextrose, which comprises, converting a corn starch acid hydrolyzate first with one enzyme discontinuing said conversion after it has progressed to a predetermined extent and completing the conversion with a second enzyme having different starch converting characteristics and terminating said second conversion step when a syrup having said predetermined composition and properties is obtained.

3. The method of producing corn syrup having predetermined chemical and physical properties and substantial predetermined contents of at least two of the starch conversion fractions comprising dextrins, higher sugars, maltose and dextrose, which comprises, converting a corn starch acid hydrolyzate simultaneously with two different enzymes having different starch converting characteristics and terminating said conversion when a syrup is obtained having said predetermined composition and properties.

4. The method of producing corn syrup having predetermined chemical and physical properties and substantial predetermined contents of at least two of the starch conversion fractions comprising dextrins, higher sugars, maltose and dextrose, which comprises treating a corn starch hydrolyzate having a D.E. value within the range of 20 to 55 and obtained by acid hydrolysis with at least two enzymes selected from the group consisting of alpha amplase, beta amylase, malt diastase and amyloglucosidase and terminating said conversion when a syrup is obtained having said predetermined composition and properties.

References Cited in the file of this patent

UNITED STATES PATENTS

| | | |
|---|---|---|
| 2,201,609 | Dale et al. | May 21, 1940 |
| 2,503,241 | Christensen | Apr. 11, 1950 |
| 2,822,303 | Campbell et al. | Feb. 4, 1958 |

FOREIGN PATENTS

| | | |
|---|---|---|
| 652,194 | Great Britain | Apr. 18, 1951 |